(12) United States Patent
Pope et al.

(10) Patent No.: US 8,543,729 B2
(45) Date of Patent: Sep. 24, 2013

(54) VIRTUALISED RECEIVE SIDE SCALING

(75) Inventors: Steven Pope, Costa Mesa, CA (US); David Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 706 days.

(21) Appl. No.: 12/745,535

(22) PCT Filed: Nov. 18, 2008

(86) PCT No.: PCT/EP2008/065774
§ 371 (c)(1),
(2), (4) Date: Jul. 6, 2010

(87) PCT Pub. No.: WO2009/068461
PCT Pub. Date: Jun. 4, 2009

(65) Prior Publication Data
US 2010/0333101 A1     Dec. 30, 2010

(30) Foreign Application Priority Data
Nov. 29, 2007 (GB) .................................. 0723422.2

(51) Int. Cl.
*G06F 15/173* (2006.01)
(52) U.S. Cl.
USPC .......................................... 709/238; 709/217
(58) Field of Classification Search
USPC .................................. 709/217, 238
See application file for complete search history.

(56) References Cited

U.S. PATENT DOCUMENTS

| | | | |
|---|---|---|---|
| 4,223,380 A * | 9/1980 | Antonaccio et al. | 709/225 |
| 5,272,599 A | 12/1993 | Koenen | |
| 5,325,532 A | 6/1994 | Crosswy et al. | |
| 5,701,413 A * | 12/1997 | Zulian et al. | 709/214 |
| 5,946,189 A | 8/1999 | Koenen et al. | |
| 6,098,112 A | 8/2000 | Ishijima et al. | |

(Continued)

FOREIGN PATENT DOCUMENTS

| | | |
|---|---|---|
| EP | 620521 A2 | 10/1994 |
| WO | 0148972 A1 | 7/2001 |

(Continued)

OTHER PUBLICATIONS

J. Evans and T. Buller; IEEE TCGN Gigabit Networking Workshop, 2001, Apr. 22, 2001.

(Continued)

*Primary Examiner* — Brian P Whipple
(74) *Attorney, Agent, or Firm* — Haynes Beffel & Wolfeld LLP; Warren S. Wolfeld (57) ABSTRACT

A method for receiving packet data by means of a data processing system having a plurality of processing cores and supporting a network interface device and a set of at least two software domains, each software domain carrying a plurality of data flows and each supporting at least two delivery channels, the method comprising: receiving at the network interface device packet data that is part of a particular data flow; selecting in dependence on one or more characteristics of the packet data a delivery channel of a particular one of the software domains, said delivery channel being associated with a particular one of the processing cores of the system; and mapping the incoming packet data into said selected delivery channel such that receive processing of the packet is performed by the same processing core that performed receive processing for preceding packets of that data flow.

41 Claims, 4 Drawing Sheets

(56) References Cited

U.S. PATENT DOCUMENTS

| | | |
|---|---|---|
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,607,167 B1 * | 10/2009 | Johnson et al. .................. 726/3 |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,664,026 B2 * | 2/2010 | Huang et al. .................. 370/231 |
| 7,688,853 B2 | 3/2010 | Santiago et al. |
| 7,747,695 B1 * | 6/2010 | Morris et al. .................. 709/206 |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,908,372 B2 * | 3/2011 | Huang et al. .................. 709/225 |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 8,117,620 B2 * | 2/2012 | Raghunath et al. ............ 718/105 |
| 8,301,523 B1 * | 10/2012 | Morris et al. .................. 705/34 |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0187914 A1 | 10/2003 | Kaniyar et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0005742 A1 | 1/2007 | Eldar et al. |
| 2007/0070904 A1 | 3/2007 | King et al. |
| 2007/0188351 A1 | 8/2007 | Brown et al. |
| 2007/0220183 A1 | 9/2007 | Kagan et al. |
| 2007/0294426 A1 * | 12/2007 | Huang et al. .................. 709/234 |
| 2007/0294435 A1 * | 12/2007 | Huang et al. .................. 709/251 |
| 2007/0299970 A1 * | 12/2007 | Huang et al. .................. 709/225 |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0023042 A1 * | 1/2011 | Pope et al. .................. 718/102 |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | | |
|---|---|---|---|
| WO | 0235838 | A1 | 5/2002 |
| WO | 2008127672 | A2 | 10/2008 |
| WO | 2009134219 | A1 | 11/2009 |
| WO | 2009136933 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference 1996, Apr. 2006.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
C. A. Thekkath, et al.; ACM Computer Communication Review, vol. 23, No. 4, Oct. 1993.

Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.

Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Gadelrab S., "10-Gigabit Ethernet Connectivity for Computer Servers," IEEE MICRO IEEE USA, 27:3, 2007, pp. 94-105.
Pratt I., et al., "Xen 3.0 and the Art of Virtualization," Proc. Linux Symp., 2005, pp. 65-77.
International Search Report mailed Apr. 23, 2009 in PCT/EP08/65774.
Dixon JT et al., "Tuning TCP and UDP Demultiplexing," Georgia Institute of Technology, CC Technical Report GIT-CC-09-09, 1998, 36 pp.
International Preliminary Report on Patentability, Chapter I, mailed May 2, 2008 in PCT/GB2006/003828.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.

Margaret L. Simmons and Harvey J. Wasserman; Proceedings of the 1988 ACM/IEEE conference on Supercomputing, p. 288-295, Orlando, Florida, Nov. 12, 1988.

David A. Borman; ACM Computer Communication Review, vol. 19, No. 2, p. 11-15, Apr. 1989.

R. Braden, et al.; ACM Computer Communication Review, vol. 19, No. 2, p. 86-94, Apr. 1989.

David D. Clark, et al.; IEEE Communications Magazine, vol. 27, No. 6, pp. 23-29, Jun. 1989.

David R. Cheriton; ACM Computer Communication Review, vol. 19, No. 4, p. 158-169, Sep. 1989.

Derek Robert McAuley; PhD Thesis, University of Cambridge, Sep. 1989.

Craig Partridge; ACM Computer Communication Review, vol. 20, No. 1, p. 44-53, Jan. 1990.

D. D. Clark and D. L. Tennenhouse; ACM Computer Communication Review, vol. 20, No. 4, pp. 200-208, Sep. 1990.

Eric C. Cooper, et al.; ACM Computer Communication Review, vol. 20, No. 4, p. 135-144, Sep. 1990.

Bruce S. Davie; ACM Computer Communication Review, vol. 21, No. 4, Sep. 1991.

C. Brendan S. Traw, et al.; ACM Computer Communication Review, vol. 21, No. 4, p. 317-325, Sep. 1991.

Ian Leslie and Derek R. McAuley; ACM Computer Communication Review, vol. 21, No. 4, p. 327, Sep. 1991.

Mark Hayter, Derek McAuley; ACM Operating Systems Review, vol. 25, Issue 4, p. 14-21, Oct. 1991.

Gregory G. Finn; ACM Computer Communication Review, vol. 21, No. 5, p. 18-29, Oct. 1991.

Greg Chesson; Proceedings of the Third International Conference on High Speed Networking, Nov. 1991.

Michael J. Dixon; University of Cambridge Computer Laboratory Technical Report No. 245, Jan. 1992.

Danny Cohen, Gregory Finn, Robert Felderman, Annette DeSchon; Made available by authors, Jan. 10, 1992.

Gene Tsudik; ACM Computer Communication Review, vol. 22, No. 5, pp. 29-38, Oct. 1992.

Peter Steenkiste; ACM Computer Communication Review, vol. 22, No. 4, Oct. 1992.

Paul E. McKenney and Ken F. Dove; ACM Computer Communication Review, vol. 22, No. 4, Oct. 1992.

Erich Ruetsche and Matthias Kaiserswerth; Proceedings of the IFIP TC6/WG6.4 Fourth International Conference on High Performance Networking IV, Dec. 14, 1992.

C. Traw and J. Smith; IEEE Journal on Selected Areas in Communications, pp. 240-253, Feb. 1993.

E. Ruetsche; ACM Computer Communication Review, vol. 23, No. 3, Jul. 1993.

\* cited by examiner

VIRTUALISED RECEIVE SIDE SCALING

BACKGROUND OF THE INVENTION

This invention relates to the reception and processing of data packets at a data processing system having a plurality of processor cores.

In conventional networked personal computers and servers having more than one CPU core, the processing of received data packets is usually performed on just one of the CPU cores. When incoming packets are received at the network card of the computer or server (generically, a data processor), they are delivered into host memory via a delivery channel. A delivery channel has an associated notification mechanism, which serves to inform the host software of the arrival of packets. Typically the notification mechanism includes an interrupt, which is raised when received packets are available for processing. In response to the interrupt an interrupt service routine is invoked on one of the CPU cores, and causes that CPU core to perform the work associated with processing the incoming packets. This work can be significant, and at high data rates this CPU core typically becomes a bottleneck in the system.

The above problem is especially severe with high data rate network architectures such as 10 and 100 Gb Ethernet. Current single processor designs struggle to cope at peak high throughput of data and any sources of inefficiency in the handling of incoming data packets must be minimised if the promise of such high data transfer speeds is to be realised.

Figure 1:
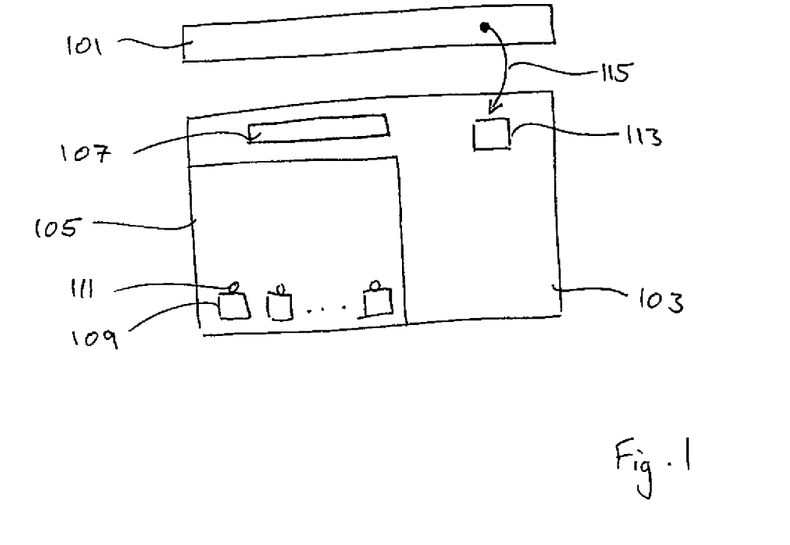
FIG. 1 shows the conventional structure of a data processing system having a monolithic operating system architecture.

FIG. 1 shows a typical structure of a data processing system having a monolithic operating system architecture. Kernel 103 manages hardware such as a network interface device (NIC) 101 by means of driver 107 and controls the resources of the system. The kernel receives hardware interrupts 115 at interrupt handler 113 and, in response to being notified that there is available incoming packet data, performs receive processing of the data. The processed traffic data is delivered to the appropriate socket 111 and application 109, which executes in user space 105.

With the aim of mitigating some of the problems described above, Microsoft has developed the Receive Side Scaling (RSS) architecture which improves performance by spreading the processing load across multiple CPU cores. Each received packet is delivered to the host via one of a number of delivery channels, each associated with a notification channel. Each notification channel is associated, typically via an interrupt, with a different CPU core, so that the packets delivered to different delivery channels are processed on different CPU cores. It is arranged that all packets of a given data flow are delivered to a single delivery channel, and so are processed at the same CPU. This is necessary to ensure that packets of a given data flow are processed in the order that they arrive.

RSS aims to provide a solution to the above problems for the monolithic Microsoft Windows operating system, and is also used on other monolithic operating systems. However, there are other multi-CPU system architectures, such as virtualised systems supporting multiple operating systems or systems supporting untrusted packet processing entities, in which RSS is not helpful because received packets are forwarded to other software domains that may not run on the same CPU core.

Figure 2A:
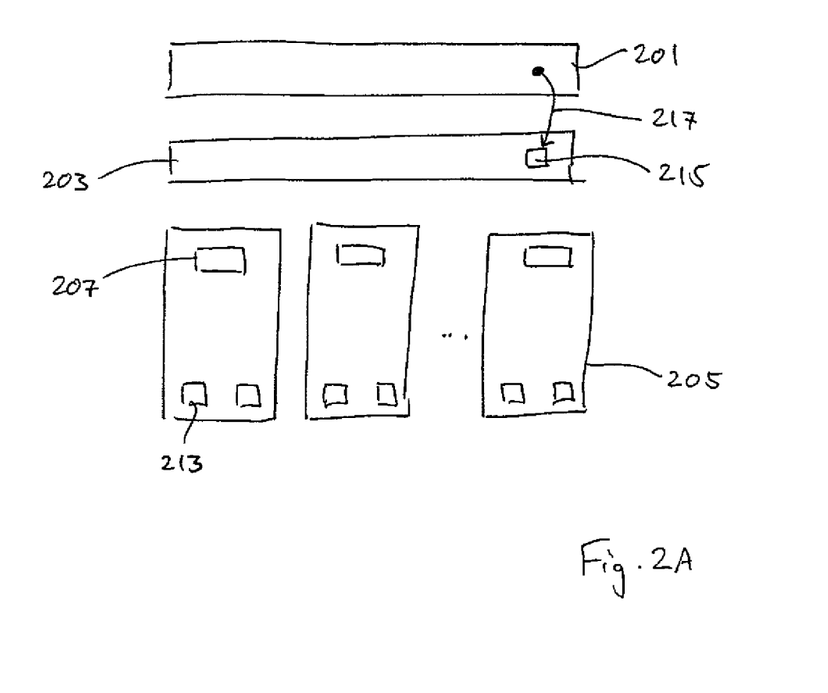
FIG. 2A shows the architecture of a conventional virtualised data processing system.

The architecture of a typical virtualised system is illustrated in FIG. 2A. Virtualised operating system instances 205 are generally untrusted and control of the hardware and resource allocation falls to a hypervisor or trusted domain 203. The hypervisor manages the hardware and the virtualised operating system instances. Each virtualised OS instance can access the network via a software-emulated network interface 207, which is typically implemented as a communication channel between the virtualised OS and the hypervisor. Packets received by the real network interface controller (NIC) 201 are delivered to the hypervisor, which routes them to the appropriate virtualised domain via the software-emulated network interface. A problem with this approach is that it incurs significant additional processing overheads when compared with the native OS receive path, and the forwarding of packets through the hypervisor can become a bottleneck in the system.

Some smart NICs are able to support multiple protected interfaces for sending and receive packets, known as virtualised network interface controllers (VNICs). Each virtualised OS domain may be given direct access to a VNIC via a memory mapping onto the NIC hardware or via a shared memory segment. The virtualised OS uses a VNIC to receive packets directly from the NIC, bypassing the hypervisor and associated forwarding overheads. Each VNIC includes a delivery channel for delivering packets and a means to notify to the virtualised OS. Such smart NICs typically have a filter table or forwarding table that maps received packets to the appropriate VNIC and virtualised OS. Received packets that do not map to any VNIC may be delivered via a default delivery channel to the host domain.

In some configurations the notification means in a VNIC includes an interrupt, which is able to invoke the virtualised OS directly when packets arrive. Alternatively the virtualised OS may be invoked via a virtual interrupt. In the latter case, instead of raising an interrupt, a virtual interrupt notification is sent to the hypervisor via a default notification channel. The hypervisor receives this virtual interrupt notification and in response invokes the virtualised OS via a virtual interrupt.

Such accelerated virtualised network I/O for virtualised OSs described above improves performance considerably. However, processing of all packets received by a guest domain is performed on just one CPU core, which may therefore become a bottleneck in the system.

Conventional methods for distributing packet processing over multiple processors, such as RSS, suffer from two main problems:

(i) Locks

State information relating to a particular data flow may be accessed by code executing on multiple processors and must therefore be protected from concurrent access. Typically this is achieved through the use of state locks. When locks are not contended they incur a relatively small (but still significant) overhead. However, when locks are contended, the loss in efficiency is very high. This can occur when a receive path executes on more than one processor core and each core is required to access the same state information of that receive path. In particular, while a kernel thread running on a processor is blocked waiting for a lock, that processor will probably not be able to perform any useful work. Processors in conventional multi-processor networked systems can spend a significant time waiting for locks.

(ii) Cache Effects

As the network stack executes on a processor, any state in host memory that it touches (reads or writes) will be copied into the cache(s) close to that processor core. When state is written, it is purged from the caches of any other processor cores. Thus, in the case when a network stack executes concurrently on multiple cores, if more than one processor writes cache lines in the state of the stack the cache lines will bounce between the cores. This is highly inefficient since each cache write operation to the network stack state by a particular processor causes the other processors handling that stack to purge, and later reload, those cache lines.

Where locks are used to protect shared state, the memory that implements those locks is itself shared state, and is also subject to cache-line bouncing.

Lock-free techniques for managing concurrent access to shared state may not suffer from the blocking behaviour of locks, but do suffer from cache-bouncing.

There is therefore a need for an improved method of distributing the processing load associated with handling network packets in data processing systems having multiple CPU cores.

SUMMARY OF THE INVENTION

According to a first aspect of the present invention there is provided a method for receiving packet data by means of a data processing system having a plurality of processing cores and supporting a network interface device and a set of at least two software domains, each software domain carrying a plurality of data flows and each supporting at least two delivery channels, the method comprising: receiving at the network interface device packet data that is part of a particular data flow; selecting in dependence on one or more characteristics of the packet data a delivery channel of a particular one of the software domains, said delivery channel being associated with a particular one of the processing cores of the system; and mapping the incoming packet data into said selected delivery channel such that receive processing of the packet is performed by the same processing core that performed receive processing for preceding packets of that data flow.

Suitably at least some of the state of each delivery channel is supported at the network interface device. Preferably each delivery channel is arranged such that receive processing of all packet data accepted into a delivery channel is performed at the same processing core. Suitably the network interface performs at least some protocol processing of the packet data.

Preferably the mapping step includes delivering a subset of the received packet data into the said delivery channel. The subset may comprise payload data. The payload data may be TCP payload data.

The processing core may be a processing unit of the network interface device.

Preferably the selecting step is performed at the network interface device.

Suitably the data flow corresponds to a network socket of the particular software domain. Suitably the one or more characteristics of the packet data comprise one or more fields of the packet header.

Preferably the selecting step comprises: matching a first subset of the one or more characteristics of the packet data to a set of stored characteristics so as to identify the particular software domain; and choosing, in dependence on a second subset of the one or more characteristics of the packet data, the delivery channel within the particular software domain.

Preferably the matching step is performed by means of a filter. Preferably the choosing step is performed by means of a hash function. Preferably the hash function is a Toeplitz function and the choosing step further includes using an indirection table.

Preferably the mapping step comprises: writing the data packet to a delivery channel of the data processing system; and delivering a notification event into a notification channel associated with the selected delivery channel. Suitably the notification channel is configured to, on receiving the notification event, cause an interrupt to be delivered to the processing core associated with the selected delivery channel. Alternatively, the notification channel is configured to, on receiving the notification event, cause a wakeup notification event to be delivered to an interrupting notification channel that is arranged to cause an interrupt to be delivered to a processing core. Preferably the said processing core is the processing core associated with the selected delivery channel.

Preferably the network interface device performs stateless packet processing.

The particular software domain may be a virtualised operating system instance. The particular software domain may be a user-level process. The particular software domain may have a lower privilege level than a kernel or hypervisor supported by the data processing system. The particular software domain may be an operating system kernel.

According to a second aspect of the present invention there is provided a data processing system arranged to perform the method according to the first aspect of the present invention.

According to a third aspect of the present invention there is provided a method for transmitting data packets onto a network by means of a data processing system having a plurality of processing cores and supporting a network interface device and a set of at least two software domains each carrying a plurality of data flows, the method comprising: at a particular one of the software domains, selecting in dependence on the data flow to which a set of data for transmission belongs, one of at least two transmit channels, said transmit channel being associated with a particular one of the processing cores of the system; and processing notification events associated with the transmission of data through the said transmit channel on the processing core associated with said transmit channel.

Preferably the transmit channel has an associated notification channel to which notification events associated with the said transmit channel are delivered. Preferably the notification channel is associated with the particular processing core associated with the selected transmit channel. Suitably the notification channel is configured to, on receiving the notification event, cause an interrupt to be delivered to the particular processing core associated with the selected transmit channel. Alternatively, the notification channel is configured to, on receiving the notification event, cause a wakeup notification event to be delivered to an interrupting notification channel that is arranged to cause an interrupt to be delivered to a processing core. Preferably the said processing core is the processing core associated with the selected transmit channel.

The software domain may be a virtualised operating system instance. The software domain may be a user-level process. The software domain may have a lower privilege level than a kernel or hypervisor supported by the data processing system. The software domain may be an operating system kernel.

According to a fourth aspect of the present invention there is provided a data processing system arranged to perform the method according to the third aspect of the present invention.

According to a fifth aspect of the present invention there is provided a data processing system arranged to perform the method according to the first aspect of the present invention and the method according to the third aspect of the present invention, wherein the system is further arranged such that the receive processing of received packet data of a first data flow and the processing of notification events associated with the transmission of data of a second data flow are performed at the same processing core if the first and second data flows are the same data flow.

According to a sixth aspect of the present invention there is provided a method for managing interaction between a data processing system and a network interface device, the data processing system having a plurality of processing cores and a set of at least two software domains each carrying a plurality of data flows, the method comprising: at the network interface device, in response to processing data of a data flow of one of the software domains, selecting in dependence on one or more characteristics of the data flow one of a set of notification channels of the software domain, each notification channel being associated with a particular one of the processing cores of the data processing system; delivering a notification event to the selected notification channel; and responsive to receiving the notification event at the selected notification channel, causing an interrupt to be delivered to the processing core associated with the selected notification channel such that processing of the notification event is performed at that processing core by a processing entity of the software domain.

The notification event may indicate that one or more data packets have been received at the network interface device. The notification event may indicate that one or more data packets have been transmitted by the network interface device.

Suitably at least some protocol processing of the data packets is performed at the network interface device. Preferably at least some protocol processing of the data packets is performed by the processing entity of the software domain.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention has general application to multi-processor data processing systems, particularly those supporting a plurality of software domains that are each capable of distributing packet processing across more than one processor. The term "processor" as used herein may refer to a CPU having one or more processing cores, a single core of a multi-core processor, some or all cores of a multi-core processor, a logical processor, a dedicated packet processing unit, or any section of a processing unit or integrated circuit. A processor can be any entity configured to execute an instruction thread in the context of the state information for that thread. The term "processor" is used to indicate both physical processors of a system and the logical processors available to a particular software domain.

Figure 2B:
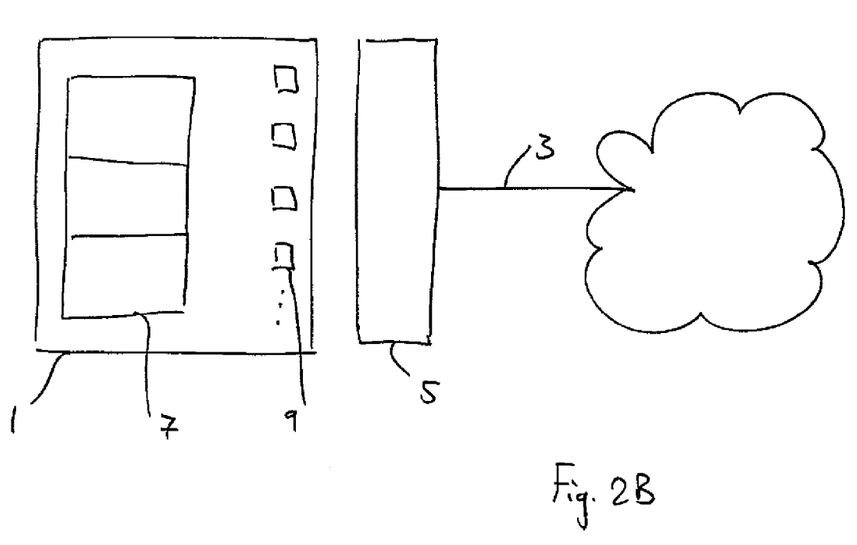
FIG. 2B is a schematic diagram of a data processing system in accordance with the present invention.

An example of a data processing system to which the present invention relates is shown in FIG. 2B. Data processing system 1 comprises a plurality of processors 9 and two or more software domains 7. Preferably the data processing system is a multi-CPU system. Each software domain may be a virtualised operating system, part of a monolithic operating system, an application, or a network stack. At least some of the software domains can have a privilege level below that of the system kernel or hypervisor (which is itself a software domain)—these software domain(s) having a lower privilege level are be referred to as "untrusted" software domains. The data processing system is arranged to access a network 3 by means of one or more network interface devices 5. A network interface device may or may not be considered to be part of data processing system 1. At least some of the two or more software domains are operable to receive and/or transmit data of the network 3 by means of network interface device(s) 5.

At least some of the software domains are configured to operate in accordance with the present invention. There may in fact be further software domains of the data processing system which do not operate in accordance with the present invention.

The term "data flow" is to be understood in the context of whichever system the present invention is embodied. Each data flow of a data processing system is generally identified by reference to an end point of the data processing system— for example, a socket, application or kernel entity. Packets belonging to two or more different data flows could be multiplexed together or aggregated in some way for transmission across network 3.

Each of the software domains 7 supports one or more delivery channels. A delivery channel is tied to a particular processor of the system and accepts incoming data packets belonging to any one of a set of data flows of the software domain such that all packets of a particular data flow of the software domain are processed at the same processor. There may be one or more data flows in the set accepted by a given delivery channel. Preferably, for each software domain, there are as many delivery channels as there are processors of the system configured to perform packet processing (the so-called "RSS processors"). There may be a different number of RSS processors available to each software domain. One or more of the RSS processors of a system may be supported at one or more network interface devices.

In the case of TCP offload architectures, such as Microsoft Chimney, the packets themselves are processed on the NIC. However, there are other aspects of receive processing that are still performed at a processor of the system—for example, completing the I/O operation associated with the received data, and waking processes or threads that are waiting for the data. Note that stateless processing, such as performing packet checksums, is preferably performed at the NIC.

A trusted software domain (such as a kernel or hypervisor) of the system preferably allocates resources to a delivery channel. A trusted software domain, or the software domain supporting a particular delivery channel, could determine which processor of the system will perform the processing of data packets accepted into that delivery channel. A data processing system has at least one trusted software domain.

When a data packet is received at the network interface device, the data packet is mapped into a particular delivery channel of a particular software domain in dependence on the data flow to which the data packet belongs. Each data packet carries an identifier which indicates the data flow to which it belongs—this may be a device address, a port number, or any other characteristic of the data packet which indicates the data flow to which it belongs. Typically, the identifier will be located in a header of the packet: for example, TCP packets specify a data flow by means of IP addresses and port numbers carried in the packet headers.

The mapping of packets to delivery channels is preferably performed at the network interface device. The mapping may be performed in dependence on header information or other characteristics of the received data packets. The mapping of packets from the NIC to their respective delivery channels may be performed in any suitable manner, including: writing each received packet to an area of system memory accessible to its respective software domain; passing each received packet to a kernel or trusted entity of the data processing system. A preferred embodiment of the mapping is set out in FIG. 5.

By ensuring that all packets of a given data flow are accepted into a single delivery channel, all data packets of that data flow will be processed at the same processor. This eliminates cache bouncing and state lock problems. Furthermore, use of a delivery channel as described ensures that packets of a given data flow will be processed in the order in which they arrive at the network interface device.

Virtualised Systems

Figure 3:
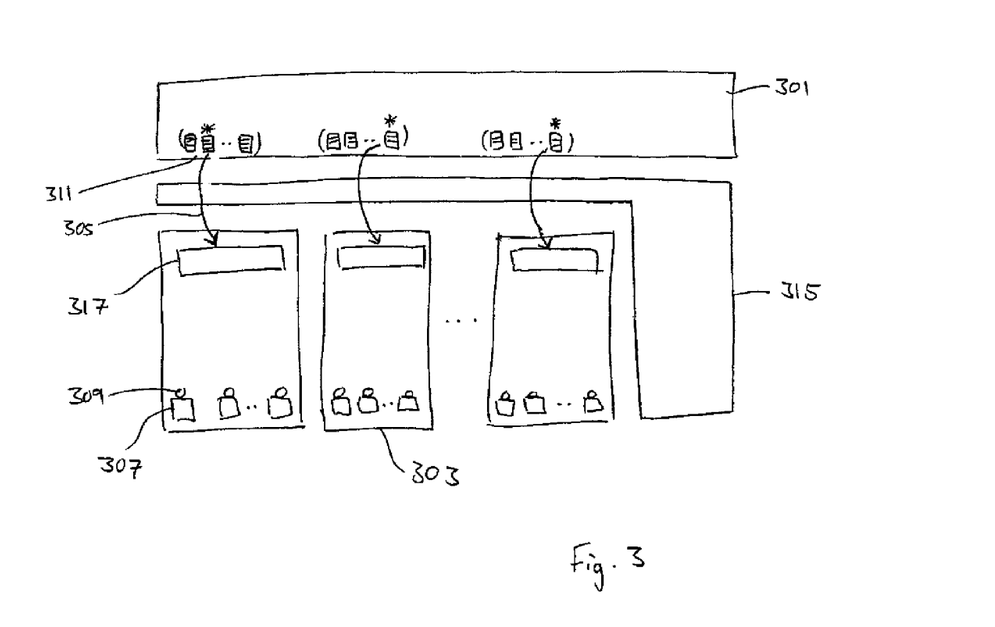
FIG. 3 is a schematic diagram of a virtualised data processing system in accordance with a first embodiment of the present invention.

In a first embodiment of the present invention, illustrated in FIG. 3, a data processing system supports two or more virtualised operating system (VOS) instances 303. Each VOS is a (typically untrusted) software domain of the data processing system that is operable to receive and/or transmit data by means of the network interface 301.

It is advantageous if each VOS (or applications supported by each VOS) can receive and/or transmit data over the network by means of the network interface, without that data being passed to hypervisor 315 (a trusted software domain). In other words, it is preferable that hypervisor 315 is not required to consume processor time (e.g. due to moving data around the system or performing packet processing) when a VOS is receiving or transmitting data by means of the NIC.

Preferably, each virtualised operating system instance supports a virtualised network interface (VNIC) or device driver that provides a software abstraction 317 of the NIC to the VOS and allows the VOS to directly access the send/receive interface of the NIC. Use of a VNIC/driver in a VOS improves transmit/receive performance because it eliminates the time- and resource-expensive communications between the untrusted virtualised OSes and the trusted software domain of the hypervisor 315.

The term hypervisor is used to refer to the trusted software domain of a virtualised data processing system that controls access to the resources of the system. The hypervisor may or may not be one and the same as any virtual machine monitor. The term hypervisor encompasses a "host domain" as used in Xen and MS Veridian, and any trusted software domain that has direct access to hardware.

The virtualised operating system instances (software domains) illustrated in FIG. 3 each support one or more applications 307 which are operable to transmit or receive data over network 3 by means of NIC 5. Each application supports one or more sockets 309 that define the end points of the data flows of the VOS.

In accordance with the present invention, data packets received at the network interface device are mapped to a delivery channel of a VOS in dependence on the data flow to which the data packet belongs. The data flow to which a packet belongs is indicated by the packet itself—typically in the packet header. Alternatively the corresponding data flow could be inferred from meta-data associated with the packet.

Since each delivery channel accepts packets belonging to one or more data flows, identifying the data flow to which a packet belongs also identifies the appropriate delivery channel. Each delivery channel is supported by a single VOS. It is sometimes appropriate for received data packets to be delivered into more than one delivery channel—for example, multicast packets. The delivery channels may be spread over more than one VOS.

It is advantageous if all the virtualised operating system instances operate in accordance with the present invention. However, some virtualised OS instances may not support multiple delivery channels, or may allocate received data packets for processing in accordance with conventional methods. Each virtualised OS instance may be a different operating system—for example, one instance might be a Unix-based OS and another might be Microsoft Windows.

Preferably the hypervisor 315 also operates as a software domain in accordance with the present invention. For example, the principles described herein may be extended to out-of-band data handled by the hypervisor and/or to data flows handled by the hypervisor. For example, all out-of-band data could be mapped to a particular delivery channel of the hypervisor so as to cause all out-of-band data to be processed at a particular CPU of the system.

Preferably, one or more of the virtualised OS instances 303 include a VNIC or driver that is configured to receive hardware interrupts (such as MSI-X interrupts) 305 from the NIC. This allows a VOS to receive notification that data packets have arrived for one or more of its delivery channels. Alternatively, one or more of the virtualised OS instances could receive virtualised interrupts: in this case, the hypervisor receives a notification from the NIC and forwards it on to the appropriate VOS. In a preferred embodiment, the interrupts are triggered by notification channels 311 having interrupts enabled, as is known in the art.

Packet-Processing Entities

Figure 4:
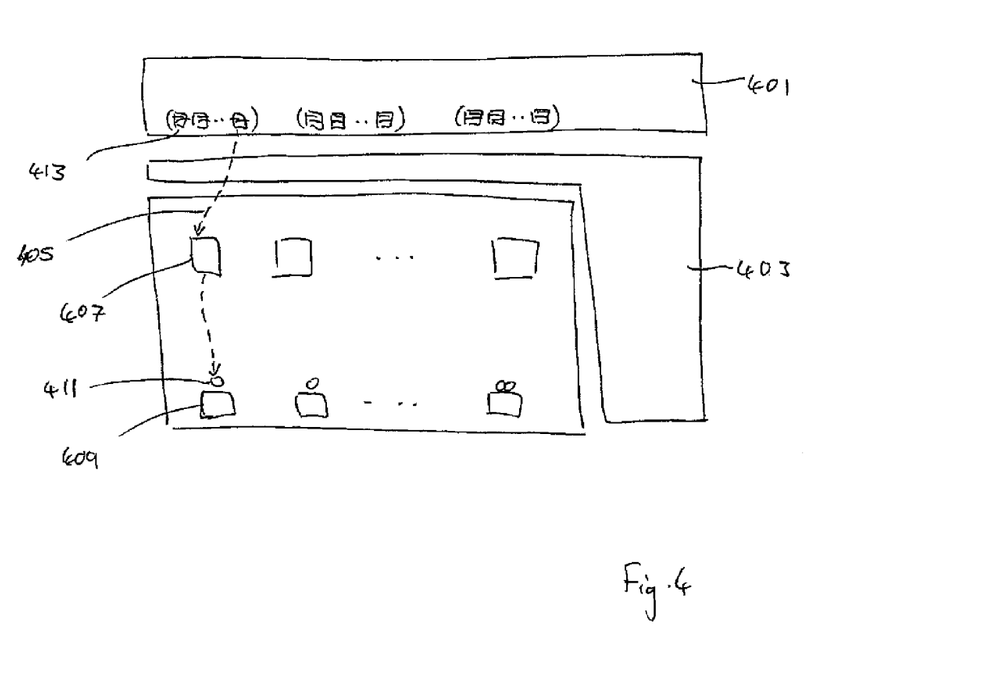
FIG. 4 is a schematic diagram of a data processing system having a user-level networking architecture in accordance with a second embodiment of the present invention.

In a second embodiment of the present invention, illustrated in FIG. 4, two or more user-level processes 407 supported in user-level environment 405 have access to network interface 401. Each user-level process forms a software domain of the data processing system and handles a plurality of data flows 405. Each user-level process supports at least one packet-processing entity configured to perform protocol processing of data packets received at the network interface or for transmission by the network interface. A user-level process therefore supports at least a partial network stack. Privileged mode environment 403 is typically a kernel or hypervisor of the data processing system.

It is advantageous if the user-level processes can receive and/or transmit data over the network by means of the NIC without data being passed to or handled by trusted software domain 403. In other words, it is preferable that the user-level packet-processing entities are not required to make system calls to the trusted software domain in order to effect transmit and receive of data packets over the network. An example of a user-level packet processing architecture is the Open Onload architecture by Solarflare Communications.

Each of the user-level processes supports two or more delivery channels by means of which received data may be passed from the network interface device. Each user-level process may also support two or more transmit channels by means of which data for transmission may be passed to the network interface device. The transmit and delivery channels allow applications 409 to transmit and receive data by means of the network interface device.

In accordance with the present invention, data packets received at the network interface device are mapped to a delivery channel of a user-level process in dependence on the data flow to which the packet data belongs. The data flow to which a packet belongs is indicated by the packet itself—typically in the packet header. Alternatively, the corresponding data flow could be inferred from one or more characteristics of the packet, such as the length of the payload data.

The data processing system illustrated in FIG. 4 supports a plurality of data flows and each data flow is directed to a particular one of the user-level processes. Since each delivery channel accepts packets belonging to one or more data flows, identifying the data flow to which a packet belongs also identifies the appropriate delivery channel.

Trusted software domain 403 could itself be a software domain in accordance with the present invention. For example, the principles described herein may be extended to out-of-band data handled by the kernel and/or to data flows handled by the kernel. For example, all out-of-band data could be mapped to a particular delivery channel of the kernel so as to cause all out-of-band data to be processed at a particular processor of the system.

The first and second embodiments described above are not mutually exclusive: one or more of the virtualised OS instances could support two or more user-level processes as described herein.

Delivery Channels

Received packet data is delivered to a software domain by means of one or more delivery channels. In preferred embodiments of the present invention, each delivery channel has one or more associated buffers into which the received packets are written. The associated buffers may be on the NIC, or in system memory accessible to the NIC as shown in FIGS. 3 and 4. It is further advantageous that the buffers associated with a delivery channel be directly accessible to the software domain. This allows received data to be delivered to the appropriate software domain without mediation by a processor.

It will be apparent that there are various mechanisms for delivering received data into a delivery channel. A delivery channel could comprise a descriptor ring with descriptors identifying the location of buffers in system memory, as is known in the art. A data processing system of the present invention could be configured such that a NIC delivers different sized packets into different descriptor rings, or a packet's header may be split from its payload data with each being delivered into separate buffers. As mentioned above, another option is for received data to be stored at the NIC until it is retrieved by the appropriate agent of each delivery channel.

Notification Channels

Each delivery channel has an associated notification channel that serves to notify the software domain of the arrival of received data. In preferred embodiments of the present invention, notification channels are able to notify software domains of other types of events. In some embodiments a delivery channel may incorporate a notification channel as part of a unified mechanism. FIGS. 3 and 4 illustrate notification channels 311, 413 into which the NIC posts notification events so as to indicate that incoming data packet(s) have been received. Events posted into a notification channel include references to the data stored in the buffers that are associated with the delivery channel. The notification channels may include non-interrupting notification channels and interrupting notification channels (notification channels with interrupts enabled), as described below. Alternatively, all notification channels may be interrupting notification channels.

The notification channels in particular may be supported at the NIC, or may be maintained by a virtualised NIC or device driver of a software domain.

Preferably there are as many notification channels as there are delivery channels in a data processing system. Preferably, there are as many interrupting notification channels as there are delivery channels in a data processing system. Each interrupting notification channel is associated with a particular one of the processors of the system, so that notification events delivered to the notification channel are handled on that processor. Preferably, in each software domain that is operable according to the present invention, there is one delivery channel and one notification channel for each processor in the software domain configured to handle received data. Alternatively, there may be a greater or lesser number of notification channels than processors.

The events posted to each notification channel are dequeued by one or more event handlers of the system. It is advantageous if each notification channel has an associated event handler that executes at the processor of the notification channel. This allows all operations relating to the handling and processing of data packets of a delivery channel to be performed at a single processor of the system. The event handler may form part of the notification channel. Alternatively, each software domain (such as a virtualised operating system instance) could support an event handler, or less preferably, there could be one or more event handlers supported at a kernel or hypervisor (as appropriate) of the system. An event handler could be part of a packet-processing thread supported at one of the RSS processors of the system.

An event handling routine iteratively dequeues events from a notification channel until the channel is empty or processing cycles are allocated to another process or virtualised operating system. An event may indicate that one or more packets have been received, in which case the event handling routine causes those received packets to be processed.

An event handler may be invoked in response to an interrupt being raised. The interrupt could be a hardware or virtualised interrupt, depending on the configuration of the system. After the event handler determines that the notification channel is empty it may re-enable the interrupt so that subsequent events will raise another interrupt.

A data processing system may be configured so that a non-interrupting notification channel generates wake-up notifications to another notification channel indicating that the first channel has received new events. Preferably the second channel is an interrupting notification channel. In response to handling a wake-up event the event handler of the first notification channel may be invoked to dequeue events of that first channel. In this way the event handler of a notification channel in a software domain that is not able handle hardware interrupts may be invoked in response to events being delivered to that channel. The event handler of the first notification channel may be invoked by way of a virtualised interrupt.

It can be advantageous to group notification channels such that only one notification channel of the group is an interrupting notification channel. The interrupting notification channel preferably holds wakeup events indicating which of the non-interrupting channels of its group have received new events. This layer of indirection can reduce the number of interrupts delivered to the processors of the system. Preferably all the notification channels in such a group relate to a single processor of the system so as to ensure that interrupts raised by means of the interrupting notification channel are handled by the processor which is to perform processing of all of the data packets indicated by events in the notification channels of the group.

In systems in which it is not possible to deliver hardware interrupts to its software entities (such as some virtualised systems and user-level packet-processing entities), all the notification channels could be non-interrupting channels. The notification channels could be virtualised notification channels that are configured to deliver virtualised interrupts into the appropriate software domains.

When a data packet is received at the NIC, a notification event is posted into the notification channel associated with the delivery channel that corresponds to the data flow to which the packet belongs. The data packet is written into a buffer, either in system memory or at the NIC. The appropriate delivery channel is selected by the network interface device on the basis of one or more characteristics of the data packet. This selection is preferably determined on the basis of one or more identifiers in the packet header that indicate which data flow the packet belongs to. Preferably the delivery channel is selected in dependence on one or more address fields of the packet header, such as the destination address and port number of an IP packet.

By identifying the data flow to which a packet belongs, the corresponding software domain, delivery channel, and notification channel (and hence RSS processor) for that packet are determined.

Packet Mapping

Figure 5:
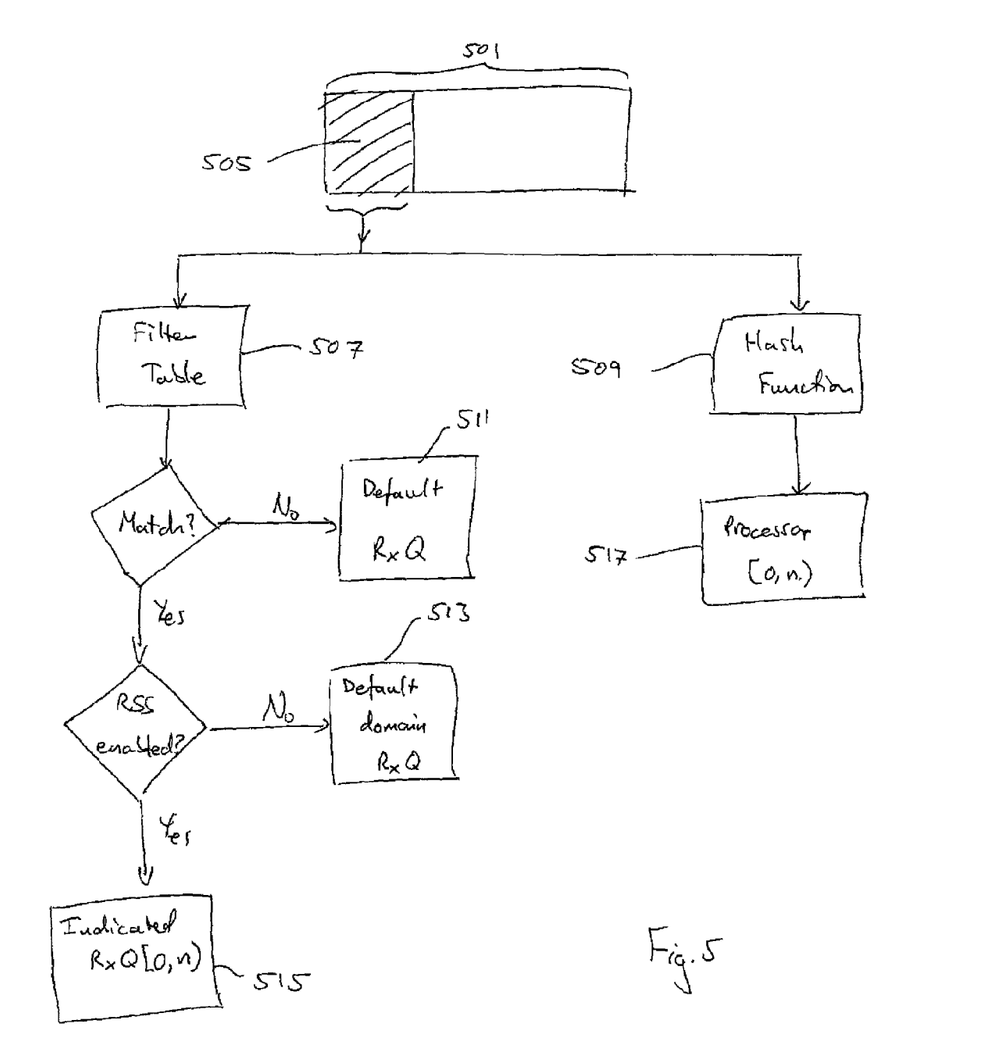
FIG. 5 is a flow diagram illustrating a two-step mapping of incoming data packets in accordance with an embodiment of the present invention.

In preferred embodiments of the present invention, the NIC performs a two-step mapping of a data packet 501 onto a particular delivery channel in dependence on the packet's header information 505. This process is illustrated in FIG. 5. The NIC reads the header information of an incoming data packet and has two mapping functionalities:
 i. a filter 507 linking one or more packet identifiers (such as predetermined fields of the packet header) to the software domain of the system to which the packet should be delivered;
 ii. a hash function 509, which, when performed on predetermined bits of the packet header, provides an indication of the RSS processor, and therefore the delivery channel, which is to handle packets of the data flow to which the received packet belongs.

The filter therefore indicates which software domain of the system a received data packet is to be directed to. A bit or flag may be stored in the filter to indicate whether receive side scaling (RSS) is enabled for a particular data flow, or for a software domain. Alternatively a bit or flag may be associated with the software domain to indicate whether RSS is enabled for that domain. If RSS is enabled, the packet is delivered to the particular delivery channel of the indicated software domain that is identified by the hash function 515. If RSS is not enabled, the packet is simply delivered to the default delivery channel of that software domain 513.

If a match is not found at the filter, the NIC delivers the packet to a default software domain of the data processing system 511—usually the hypervisor or kernel. Alternatively the NIC may deliver the packet to each of the software domains.

A system of the present invention may be configured to apply RSS algorithms only to certain kinds of packets. For example, RSS may be applied only to TCP/IP v4 and v6 packets. Only the first step of mapping a packet into a software domain need be performed for packets to which RSS does not apply.

The hash function is performed on predetermined bits of an incoming packet header and the result of the function is used to identify a delivery channel of the software domain indicated by the filter. In accordance with the present invention, the selection of a particular delivery channel determines a notification into which indications for received packets are posted. Because each notification channel is associated with a particular processor of the system, the output of the hash function therefore determines at which processor 517 of the system processing of the received packet is performed. Since the hash function calculates the same output for each packet that belongs to the same data flow, each packet of that data flow will be delivered to the same processor.

In a particularly preferred embodiment, the hash function takes as its input various fields from the packet headers and a key associated with the software domain, and the result is a large number, hash. Low order bits taken from that number are used to select an entry from a table associated with the software domain, sw_domain.rss_table[hash & mask]. The value of the entry in this table identifies one of a set of delivery channels. This selection algorithm may be roughly expressed in pseudo-code as:

```
sw_domain = sw_domain_lookup(packet)
rss_hash = calculate_hash(packet, sw_domain.rss_key)
delivery_channel = sw_domain.rss_table[rss_hash & mask]
```

Of course, this is just one of many possible implementations of the present invention; others will be apparent to those skilled in the art.

The functions of either the filter and hash function may alternatively be performed by any one of a filter, forwarding table, a hash function (e.g. a Toeplitz function), or any other suitable mapping or technique known in the art, and the terms "filter" and "hash function" as used herein shall apply accordingly.

Each software domain that is configured in accordance with the teachings of the present invention supports two or more delivery channels arranged such that data packets received into one of the delivery channels is processed at a particular RSS processor of the system. The kernel or hypervisor (i.e. a trusted software domain) of the system may allocate a set or group of RSS processors for performing packet processing to all or some of the untrusted software domains of the system. The software domains of the system need not all utilise the same number of RSS processors.

In light of the above, it is clear that all the software domains of a system need not use the same number of delivery channels or notification channels. Furthermore, each delivery channel may be arbitrarily associated with a processor of the system in the sense that it may not be important which processor is associated with which delivery channel, provided that the mapping of data packets to delivery channels is performed consistently such that packets of a particular data flow are always handled at the same processor. Some operating systems dictate a particular mapping of received packets to RSS processors.

An interrupting notification channel may be configured to trigger interrupts only when it is primed or not blocked. This can be advantageous to prevent an interrupt being delivered to a processor in certain situations—for example, when the processor is processing high priority threads or when a device or thread has taken exclusive control of the processor.

It can be advantageous for hardware interrupts to be delivered to a trusted software domain of the data processing system. For instance, some received data packets may be directed to untrusted software domains of the system that cannot receive hardware interrupts, or the trusted domain may be configured in handle all hardware interrupts for reasons of system integrity or security. In such configurations, the trusted domain is preferably arranged to deliver virtualised interrupts into the indicated software domains so as to trigger execution of the appropriate event handling processes.

In a preferred embodiment, in conjunction with writing a notification to a notification channel, the NIC writes incoming data packets to that notification channel's corresponding delivery channel. The channels are preferably supported at an area of memory allocated to the software domain to which the packets belong. Each notification event identifies the delivery channel (for example, as an address in memory) to which one or more data packets have been written. A notification event may include the result of the filter and/or hash function. This can be useful to indicate to an event handler of a software domain which delivery channel the data packets belong to.

In the embodiment described here, it is the NIC which performs the mapping of received packets to their appropriate delivery channels. However, embodiments are envisaged that one or both of the mapping steps could be performed at a software domain of the data processing system. For example, a NIC could deliver all received packets to a trusted domain of the data processing system and the mapping operations could be performed at that trusted domain.

Transmit Processing

A data processing system of the present invention preferably extends the principles described herein to transmit data processing. A software domain supports one or more transmit channels, each of which is associated with a particular processor of the system such that the transmit processing of data belonging to a particular data flow is performed at the same processor at which all previous transmit processing of that data flow was performed.

On the transmit path it is particularly efficient if there is one transmit channel per processor (the processor to which the corresponding transmit channel is tied). Notifications for transmit completions are therefore delivered to the same processor which performs the transmit processing. Preferably, data for transmission that belongs to a particular data flow is delivered into the transmit channel associated with the RSS processor of that data flow. In other words, a data flow can be considered to include a transmit data flow and an associated receive data flow, and the system is configured such that both receive and transmit processing of packets belonging to that data flow is performed at the same processor.

The principles of the present invention may be applied at any kind of data processor capable of processing incoming data packets, including personal computers, laptops, servers, bridges, switches, and routers. The data packets received at the NIC may be any kind of data packets. For example, the packets may be TCP/IP or UDP packets. The data processing system and NIC may support any set of protocols—for example, the data layer protocol in particular could be IEEE 802.11, Ethernet or ATM.

A network interface device as described herein could be an expansion card, a computer peripheral or a chip of any kind integrated into the data processing system—for example, the chip could be installed on the motherboard. The network interface device preferably supports a processor for performing, for example, packet mapping and physical layer receive/transmit processing.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for receiving packet data by means of a data processing system having a plurality of processing cores and supporting a network interface device and a set of at least two untrusted software domains, each untrusted software domain: (a) carrying a plurality of data flows; (b) supporting at least two delivery channels between the network interface device and the respective untrusted software domain; and (c) being operable to perform receive processing of received packet data at a processing core of the data processing system, the method comprising:
  receiving at the network interface device packet data that is part of a particular data flow;
  selecting in dependence on one or more characteristics of the packet data a delivery channel of a particular one of the untrusted software domains, said delivery channel being associated with a particular one of the processing cores of the data processing system; and
  mapping the incoming packet data into the selected delivery channel such that receive processing of the packet data is performed in the untrusted software domain by the same processing core that performed receive processing for preceding packets of that data flow.

2. A method as claimed in claim 1, wherein at least some of the state of each delivery channel is supported at the network interface device.

3. A method as claimed in claim 1, wherein each delivery channel is arranged such that receive processing of all packet data accepted into a delivery channel is performed at the same processing core.

4. A method as claimed in claim 1, wherein the network interface performs at least some protocol processing of the packet data.

5. A method as claimed in claim 4, wherein the mapping step includes delivering a subset of the received packet data into the delivery channel.

6. A method as claimed in claim 5, wherein the subset comprises payload data.

7. A method as claimed in claim 6, wherein the payload data is TCP payload data.

8. A method as claimed in claim 1, wherein the selecting step is performed at the network interface device.

9. A method as claimed in claim 1, wherein the data flow corresponds to a network socket of the particular untrusted software domain.

10. A method as claimed in claim 1, wherein the one or more characteristics of the packet data comprise one or more fields of the packet header.

11. A method as claimed in claim 1, wherein the selecting step comprises:
  matching a first subset of the one or more characteristics of the packet data to a set of stored characteristics so as to identify the particular software domain; and
  choosing, in dependence on a second subset of the one or more characteristics of the packet data, the delivery channel within the particular untrusted software domain.

12. A method as claimed in claim 11, wherein the matching step is performed by means of a filter.

13. A method as claimed in claim 11, wherein the choosing step is performed by means of a hash function.

14. A method as claimed in claim 13, wherein the hash function is a Toeplitz function and the choosing step further includes using an indirection table.

15. A method as claimed in claim 1, wherein the mapping step comprises:
   writing the data packet to a delivery channel of the data processing system; and
   delivering a notification event into a notification channel associated with the selected delivery channel.

16. A method as claimed in claim 15, wherein the notification channel is configured to, on receiving the notification event, cause an interrupt to be delivered to the processing core associated with the selected delivery channel.

17. A method as claimed in claim 15, wherein the notification channel is configured to, on receiving the notification event, cause a wakeup notification event to be delivered to an interrupting notification channel that is arranged to cause an interrupt to be delivered to a processing core.

18. A method as claimed in claim 17, wherein the processing core is the processing core associated with the selected delivery channel.

19. A method as claimed in claim 1, wherein the network interface device performs stateless packet processing.

20. A method as claimed in claim 1, wherein the particular untrusted software domain is a virtualised operating system instance.

21. A method as claimed in claim 1, wherein the particular untrusted software domain is a user-level process.

22. A method as claimed in claim 1, wherein the untrusted software domains are virtualised operating systems having a lower privilege level than a system kernel or hypervisor supported by the data processing system.

23. A method as claimed in claim 1, wherein the untrusted software domains are applications having a lower privilege level than a system kernel or hypervisor supported by the data processing system.

24. A data processing system arranged for receiving packet data, comprising a plurality of processing cores and supporting a network interface device and a set of at least two untrusted software domains, each untrusted software domain: (a) carrying a plurality of data flows; (b) supporting at least two delivery channels between the network interface device and the respective untrusted software domain; and (c) being operable to perform receive processing of received packet data at a processing core of the data processing system, the data processing system being configured to:
   receive at the network interface device packet data that is part of a particular data flow;
   select in dependence on one or more characteristics of the packet data a delivery channel of a particular one of the untrusted software domains, said delivery channel being associated with a particular one of the processing cores of the data processing system; and
   map the incoming packet data into the selected delivery channel such that receive processing of the packet data is performed in the untrusted software domain by the same processing core that performed receive processing for preceding packets of that data flow.

25. A method for transmitting data packets onto a network by means of a data processing system having a plurality of processing cores and supporting a network interface device and a set of at least two untrusted software domains, each untrusted software domain: (a) carrying a plurality of data flows; (b) supporting at least two transmit channels between the network interface device and the respective untrusted software domain, and (c) being operable to process notification events associated with the transmission of data at a processing core of the data processing system, the method comprising:
   at a particular one of the untrusted software domains, selecting in dependence on the data flow to which a set of data for transmission belongs, one of at least two transmit channels, said transmit channel being associated with a particular one of the processing cores of the data processing system; and
   processing notification events associated with the transmission of data through the transmit channel on the processing core associated with said transmit channel.

26. A method as claimed in claim 25, wherein the transmit channel has an associated notification channel to which notification events associated with the transmit channel are delivered.

27. A method as claimed in claim 26, wherein the notification channel is associated with the particular processing core associated with the selected transmit channel.

28. A method as claimed in claim 26, wherein the notification channel is configured to, on receiving the notification event, cause an interrupt to be delivered to the particular processing core associated with the selected transmit channel.

29. A method as claimed in claim 26, wherein the notification channel is configured to, on receiving the notification event, cause a wakeup notification event to be delivered to an interrupting notification channel that is arranged to cause an interrupt to be delivered to a processing core.

30. A method as claimed in claim 29, wherein the processing core is the processing core associated with the selected transmit channel.

31. A method as claimed in claim 25, wherein the untrusted software domain is a virtualised operating system instance.

32. A method as claimed in claim 25, wherein the untrusted software domain is a user-level process.

33. A method as claimed in claim 25, wherein the untrusted software domains are virtualised operating systems having a lower privilege level than a system kernel or hypervisor supported by the data processing system.

34. A method as claimed in claim 25, wherein the untrusted software domains are applications having a lower privilege level than a system kernel or hypervisor supported by the data processing system.

35. A data processing system arranged for transmitting data packets onto a network, comprising a plurality of processing cores and supporting a network interface device and a set of at least two untrusted software domains, each untrusted software domain: (a) carrying a plurality of data flows; (b) supporting at least two transmit channels between the network interface device and the respective untrusted software domain; and (c) being operable to process notification events associated with the transmission of data at a processing core of the data processing system, the data processing system being configured to:
   at a particular one of the untrusted software domains, select in dependence on the data flow to which a set of data for transmission belongs, one of at least two transmit channels, said transmit channel being associated with a particular one of the processing cores of the data processing system; and
   process notification events associated with the transmission of data through the transmit channel on the processing core associated with said transmit channel.

36. A data processing system arranged to receive and transmit packet data by means of a data processing system having a plurality of processing cores and supporting a network interface device and a set of at least two untrusted software domains, each untrusted software domain: (a) carrying a plurality of data flows; (b) supporting at least two delivery channels between the network interface device and the respective untrusted software domain; (c) being operable to perform receive processing of received packet data at a processing core of the data processing system; and (d) being operable to process notification events associated with the transmission of data at a processing core of the data processing system, the data processing system arranged to perform data receiving steps of:

receiving at the network interface device packet data that is part of a first data flow;

selecting in dependence on one or more characteristics of the packet data a delivery channel of a particular one of the untrusted software domains, said delivery channel being associated with a first one of the processing cores of the data processing system; and     mapping the incoming packet data into the selected delivery channel such that receive processing of the packet data is performed in the untrusted software domain by the same processing core that performed receive processing for preceding packets of that first data flow, the data processing system further arranged to perform data transmitting steps of:

at a particular one of the untrusted software domains, selecting in dependence on a second data flow to which a set of data for transmission belongs, one of at least two transmit channels, said selected transmit channel being associated with a second one of the processing cores of the data processing system; and     processing notification events associated with the transmission of data through the selected transmit channel on the second processing core, the data processing system further arranged to determine whether the first and second data flows are the same data flow, and if so, then to select the same processing core for both the data receiving steps of the first flow and the data transmitting steps of the second flow.

37. A method for managing interaction between a data processing system and a network interface device, the data processing system having a plurality of processing cores and supporting a set of at least two untrusted software domains, each untrusted software domain: (a) carrying a plurality of data flows; (b) supporting a set of at least two notification channels; and (c) being operable to process notification events at a processing core of the data processing system, the method comprising:

at the network interface device, in response to processing data of a data flow of one of the untrusted software domains, selecting in dependence on one or more characteristics of the data flow one of the set of notification channels of the software domain, each notification channel being associated with a particular one of the processing cores of the data processing system;

delivering a notification event to the selected notification channel; and     responsive to delivering the notification event to the selected notification channel, causing an interrupt to be delivered to the processing core associated with the selected notification channel such that processing of the notification event is performed at that processing core by a processing entity of the software domain.

38. A method as claimed in claim 37, wherein the notification event indicates that one or more data packets have been received at the network interface device.

39. A method as claimed in claim 37, wherein the notification event indicates that one or more data packets have been transmitted by the network interface device.

40. A method as claimed in claim 37, wherein at least some protocol processing of the data packets is performed at the network interface device.

41. A method as claimed in claim 25, wherein the untrusted software domains are applications having a lower privilege level than a system kernel or hypervisor supported by the data processing system.

\* \* \* \* \*